United States Patent
Stettner et al.

(10) Patent No.: US 10,590,511 B2
(45) Date of Patent: Mar. 17, 2020

(54) PROCESS FOR DIGESTION OF A METALLIC IRIDIUM- AND/OR IRIDIUM OXIDE-COMPRISING MIXTURE OF SOLID PARTICLES

(71) Applicant: Heraeus Deutschland GmbH & Co. KG, Hanau (DE)

(72) Inventors: Martin Stettner, Altenstadt (DE); Magdalena Günther, Biebergemünd (DE); Stefanie Fuchs Alameda, Biebergemünd (DE); Vasco Thiel, Alzenau (DE); Steffen Voß, Limeshain (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 293 days.

(21) Appl. No.: 15/566,332

(22) PCT Filed: Feb. 24, 2016

(86) PCT No.: PCT/EP2016/053818
§ 371 (c)(1),
(2) Date: Oct. 13, 2017

(87) PCT Pub. No.: WO2016/169674
PCT Pub. Date: Oct. 27, 2016

(65) Prior Publication Data
US 2018/0112290 A1    Apr. 26, 2018

(30) Foreign Application Priority Data
Apr. 21, 2015    (EP) ..................... 15164448

(51) Int. Cl.
*C22B 3/00*    (2006.01)
*C22B 5/12*    (2006.01)

(52) U.S. Cl.
CPC .............. *C22B 11/044* (2013.01); *C22B 5/12* (2013.01); *Y02P 10/214* (2015.11)

(58) Field of Classification Search
CPC ............................. C22B 11/04; C22B 11/044
See application file for complete search history.

(56) References Cited

U.S. PATENT DOCUMENTS

| | | | | |
|---|---|---|---|---|
| 4,002,470 A | * | 1/1977 | Isa ........................ | C01G 55/004 75/421 |
| 4,557,906 A | * | 12/1985 | Douglas ............... | C01G 41/003 423/49 |
| 6,458,183 B1 | | 10/2002 | Phillips et al. | |
| 2008/0261477 A1 | | 10/2008 | Nomura et al. | |

FOREIGN PATENT DOCUMENTS

| | | |
|---|---|---|
| EP | 2090669 A2 | 8/2009 |
| GB | 2413323 A | 10/2005 |
| JP | 2009235513 A | 10/2009 |
| KR | 20100131238 A | 12/2010 |
| KR | 10-2011-0029494 A | 3/2011 |

OTHER PUBLICATIONS

Balcerzak. Sample Digestion Methods for the Determination of Traces of Precious Metals by Spectrometric Techniques. Analytical Sciences, vol. 18. Jul. 2002, p. 737-750. (Year: 2002).*
International Search Report issued in PCT/EP2016/053818 dated May 24, 2016.

\* cited by examiner

*Primary Examiner* — Keith D. Hendricks
*Assistant Examiner* — Joshua S Carpenter
(74) *Attorney, Agent, or Firm* — Blank Rome LLP

(57) ABSTRACT

A process for digestion of fine iridium includes (a) alkaline oxidative digestion of 1 part by weight fine iridium and 3 to 20 parts by weight of a combination comprising 40 to 70 parts by weight sodium hydroxide, 15 to 30 parts by weight sodium nitrate, and 10 to 40 parts by weight sodium peroxide in the melt, whereby the sum of the weight fractions equals 100 parts by weight; (b) cooling the digestion material formed in step (a) to 20 to 70° C.; (c) dissolving the acid-soluble fractions of the cooled digestion material in water/halogen hydracid until an acidic aqueous solution with a pH value of −1 to +1 is obtained; and (d) boiling the acidic aqueous solution obtained in step (c) until the formation of nitrous gases is completed. Insoluble ingredients can be separated from the acidic aqueous solution before or after step (d), if needed.

14 Claims, No Drawings

PROCESS FOR DIGESTION OF A METALLIC IRIDIUM- AND/OR IRIDIUM OXIDE-COMPRISING MIXTURE OF SOLID PARTICLES

This application is a national stage of International Patent Application No. PCT/EP2016/053818, filed Feb. 24, 2016, which claims the benefit of European Patent Application 15164448.1, filed Apr. 21, 2015, each of which is hereby incorporated by reference in its entirety.

The present invention relates to a process for digestion of a metallic iridium—and/or iridium oxide-comprising mixture of solid particles. The aim of the process is to completely digest iridium and to obtain an aqueous solution that can be used for further purification and extraction of iridium or iridium compounds.

In this context and hereinafter, iridium oxide shall be understood to mean $Ir_2O_3$ and/or $IrO_2$.

Mixtures of inorganic solid particles that are difficult to digest and contain metallic iridium and/or iridium oxide at a total iridium fraction of 20 to 99% by weight (percent by weight) in the mixture can originate from a variety of sources. Said mixtures can be, for example, ore concentrates from ore processing or iridium-containing residues from processes of precious metal refining. The applicant refers to said mixtures as iridium fines, a term that shall be used for said mixtures hereinafter.

In the scope of the present invention, fine iridium shall be understood to be, in particular, those mixtures of solid particles that consist of
(A) 0 to 99% by weight metallic iridium;
(B) 0 to 20% by weight of at least one elemental metal different from iridium, selected from the group of metals of atomic numbers 13, 21-30, 39-50, 72-76, and 78-82;
(C) 0 to 99% by weight iridium oxide;
(D) 0 to 70% by weight of at least one metal oxide different from iridium oxide;
(E) 0 to 30% by weight of at least one inorganic substance different from (A) to (D); and
(F) 0 to 1% by weight organic substance, whereby the sum of the weight fractions in % by weight of components (A) to (F) adds up to 100% by weight and the total iridium content of the fine iridium is 20 to 99% by weight.

The metal oxides of component (D) are oxides of the metals of component (B), alkali metal oxides and/or alkaline earth metal oxides; to preclude any confusion: peroxides or superoxides of said metals are excluded. In general, the metals of the metal oxides of component (D) have oxidation numbers in the range of +1 to +4. The metal oxides of component (D) are solids.

The at least one inorganic substance of component (E) that is different from (A) to (D) comprises, in particular, neither (i) substances reacting acidic, such as, for example, acids, acidic salts, acid anhydrides or the like, nor (ii) substances that can be oxidised by means of sodium peroxide or sodium nitrate while producing fire or even an explosion such as, for example, inorganic reducing agents. The at least one inorganic substance of component (E) that is different from (A) to (D) can be selected, for example, from the group consisting of (i) solid non-metal oxides such as, for example, silicon dioxide, (ii) simple or complex salts such as, for example, silicates, sulfides, phosphides, sulfites, phosphites, sulfates, phosphates, and metalates, (iii) oxo, sulfur and/or phosphorus compounds of one or more metals of atomic numbers 13, 21-30, 39-50, 72-82 that are different from oxides, simple salts, and complex salts of component (ii), and (iv) carbon, for example soot or graphite. The inorganic substances of component (E) essentially are solids, i.e. 95 to 100% by weight, preferably 99 to 100% by weight, particularly all of component (E) are solids.

Preferably, the fine iridium comprises no component (F). However, it can possibly contain >0 to 1% by weight of component (F), but this would generally be due to technical reasons and therefore inevitable.

Inspected visually, the fine iridium mixtures are virtually homogeneous, not least due to the absolute grain sizes of their solid particles, which are in the range of, for example, 50 to 200 μm. In this context, the individual solid particle or particles can comprise one or more of components (A) to (F).

It is known to process fine iridium for the purpose of digesting the iridium contained in it by means of dry chlorination or alkaline oxidative melting with KOH. These processes are time-consuming and expensive; moreover, potassium may interfere with the subsequent further refining of precious metals.

Alkaline oxidative digestion of fine iridium by means of an NaOH melt is unsuccessful and/or incomplete.

The digestion of metallic iridium by sintering with barium peroxide at high temperature is known from GB2413323A.

The applicant has made successful attempts to subject fine iridium to alkaline oxidative digestion by means of a NaOH/$Na_2O_2$ melt. However, these NaOH/$Na_2O_2$ melts are very aggressive media that attack even steel, and therefore common apparatuses as well, and are therefore unfavourable.

It has been evident that the disadvantages described above can be circumvented by the digestion process for fine iridium illustrated in the following.

The present invention consists of a process for digestion of fine iridium, comprising the steps of:
(a) alkaline oxidative digestion of 1 part by weight fine iridium and 3 to 20 parts by weight of a combination comprising 40 to 70 parts by weight sodium hydroxide, 15 to 30 parts by weight sodium nitrate, and 10 to 40 parts by weight sodium peroxide in the melt, whereby the sum of the weight fractions adds up to 100 parts by weight;
(b) cooling the digestion material formed in step (a) to 20 to 70° C.;
(c) dissolving the acid-soluble fractions of the cooled digestion material in water/halogen hydracid until an acidic aqueous solution with a pH value in the range of −1 to +1 is obtained; and
(d) boiling the acidic aqueous solution obtained in step (c) until the formation of nitrous gases is completed;

whereby a step (e) of separating insoluble ingredients from the acidic aqueous solution can take place before or after step (d), if needed.

The terms, "halogen", "hydrohalic acid" or "hydrohalic", used in the description and in the claims shall be understood to mean bromine and/or chlorine, preferably chlorine, hydrobromic acid and/or hydrochloric acid, preferably hydrochloric acid, and/or hydrobromic and/or hydrochloric, preferably hydrochloric.

In step (a) of the process according to the invention, 1 part by weight fine iridium and 3 to 20 parts by weight, preferably 3 to 10 parts by weight, of a combination comprising 40 to 70 parts by weight sodium hydroxide, 15 to 30 parts by weight sodium nitrate, and 10 to 40 parts by weight sodium peroxide in the melt, is digested by alkaline oxidation, whereby the sum of the weight fractions adds up to 100 parts by weight. Preferably, the combination comprises 45 to 60 parts by weight sodium hydroxide, 15 to 25 parts by weight sodium nitrate, and 15 to 25 parts by weight sodium peroxide, whereby the sum of the weight fractions adds up to 100 parts by weight. Particularly preferably, the combination comprises no further substances aside from sodium hydroxide, sodium nitrate, and sodium peroxide.

As a matter of principle, there is no restriction on the order, in which the additions of fine iridium, sodium hydroxide, sodium nitrate, and sodium peroxide are made in process step (a), except for the expediency of adding the sodium hydroxide first and adding the sodium peroxide last, i.e. after the addition of the fine iridium. Accordingly, it is expedient to initially prepare a sodium hydroxide melt or a melt consisting of sodium hydroxide and a fraction, for example 20 to 60% by weight, of the sodium nitrate. In this context, the fine iridium can be added at any time, for example before, during and/or after melting the sodium hydroxide and/or sodium hydroxide/sodium nitrate completely; in other words, the fine iridium can be added in one or several aliquots in this context. The temperature inside the melt in and/or up to this stage of process step (a) is in the range of, for example, 400 to 450° C. Subsequently, the sodium nitrate or the fraction of sodium nitrate still to be added as well as the sodium peroxide are added while keeping an eye on the temperature increase that usually occurs; it is preferable not to exceed a temperature of 580° C. in the melt in this context. After all components have been added completely, the melt thus obtained is made to have a temperature in the range of, for example, 600 to 660° C. and is maintained at this level for, for example, 2 to 5 hours, preferably by mixing, for example by stirring.

In process step (b) of the process according to the invention, the digestion material formed in step (a) is cooled to 20 to 70° C., upon which it solidifies. It can be expedient to move the digestion material into one or more container(s), in which the subsequent process step (c) takes place, while it is still a melt, and to allow the cooling to take place therein. The cooling process usually takes place as a passive process not supported by cooling.

In process step (c) of the process according to the invention, the acid-soluble fractions of the digestion material cooled to 20 to 70° C. are dissolved in water/halogen hydracid until an acidic aqueous solution with a pH value in the range of −1 to +1 is obtained. The determination of the pH value is not subject to any special requirements and can be done with a common pH meter.

It can be expedient to proceed by first taking up the digestion material in water and/or by adding water to the digestion material followed by adding halogen hydracid, in particular strong halogen hydracid, e.g. 8N to 12N halogen hydracid, until an acidic aqueous solution with a pH value in the range of −1 to +1 is obtained. For example, a weight ratio of digestion material:water: 8N to 12N halogen hydracid in the range of 1:2-5:3-10 can be used in process step (c). It is expedient to suspend the digestion material in the aqueous phase, for example by stirring.

The acidic aqueous solution or, to be more specific, the acidic aqueous solution that is free or has been freed or still needs to be freed of insoluble ingredients is boiled in process step (d) of the process according to the invention until the formation of nitrous gases ($NO_x$) is completed, i.e. at boiling temperature. The end of the formation of nitrous gases can be monitored visually and, if desired, also analytically, for example by determination of the nitrite and nitrate contents in the aqueous solution. It is possible to add water and/or halogen hydracid to keep the pH in the range of −1 to +1 during the boiling process, which serves not only to remove nitrite and/or nitrate in the form of nitrous gases, but also to make the solution more concentrated. The boiling process usually takes 5 to 15 hours.

An acidic aqueous solution containing the digested iridium in dissolved form, presumably as a halide and/or halogeno-iridate, is obtained after completion of process step (d).

As indicated above, the process according to the invention can comprise a process step (e), if needed. Accordingly, if the digestion material contains small fractions of ingredients that are insoluble in the acidic aqueous solution and/or if the acidic aqueous solution obtained in process step (c) contains small amounts of insoluble ingredients, for example on the order of up to 5% by weight relative to the digestion material obtained in process steps (a) and/or (b), said ingredients can be separated in said optional process step (e). Conventional solid-liquid separation procedures known to a person skilled in the art can be used in this context, for example decanting, lifting, filtration or suitable combinations of said separation procedures. Process step (e) can take place before or after process step (d).

The process according to the invention is characterised by its high rate of iridium recovery from the acidic aqueous solution obtained in process step (d). For example, the recovery rate is 97-100%, relative to the iridium contained in the fine iridium used in process step (a). In other words, the process according to the invention allows for complete or at least nearly complete digestion of fine iridium such that the iridium contained therein is converted into an form that is dissolved in water. The acidic aqueous solution obtained in process step (d) allows for further purification and extraction of iridium or iridium compounds by means of common methods that are known to a person skilled in the art.

EXAMPLES

Example 1

A total of 35 kg sodium nitrate and 200 kg sodium hydroxide were placed in a melting crucible and melted at 410° C. While stirring for a period of 1.5 hours, another 35 kilograms sodium nitrate and 70 kg fine iridium (composition according to X-ray fluorescence analysis, RFA, each given in % by weight: 9 iridium, 3.4 aluminium, 7 silicon, 1.8 calcium, 1.8 chromium, 15 iron, 11 copper, 9 zinc, 3.2 rhodium, 1.5 platinum) were added. Subsequently, 70 kg sodium peroxide were added in aliquots, upon which the temperature of the melt increased. The stirring was continued for 1 h after the addition of the sodium peroxide. Then the temperature was increased to 610° C. and maintained at this level for a period of 5 hours. Subsequently, the melt was poured into two melting tanks. After cooling to 20° C., a total of 1,000 L water were added to the solidified melt and a suspension was formed for 4 hours. The strongly alkaline suspension thus obtained was adjusted to a pH of −0.5 with 1,400 L 10N hydrochloric acid in a vessel. The temperature increased to 70° C. in this context. The solution thus obtained was boiled for a period of 12 hours while releasing nitrous gases, whereby another 900 L 10N hydrochloric acid were added to maintain the pH of the solution at −0.5. Then the solution was filtered.

The iridium recovery rate was 97% (calculated from the iridium content of the acidic solution determined by means of inductively coupled plasma emission (ICP) relative to the fine iridium used in the process, which had an iridium fraction of 9% by weight).

Example 2

A total of 35 kg sodium nitrate and 200 kg sodium hydroxide were placed in a melting crucible and melted at 410° C. While stirring for a period of 1.5 hours, another 35 kilograms sodium nitrate and 70 kg fine iridium (composition according to X-ray fluorescence analysis, RFA, each given in % by weight: 53 iridium, 2.8 aluminium, 6.1 platinum, 2.6 iron, 3.3 silicon, 0.8 chromium, 0.3 nickel) were added. Subsequently, 80 kg sodium peroxide were added in aliquots, upon which the temperature of the melt increased. The stirring was continued for 1 h after the addition of the sodium peroxide. Then the temperature was increased to 610° C. and maintained at this level for a period of 5 hours. Subsequently, the melt was poured into two melting tanks. After cooling to 20° C., a total of 1,000 L of water were added to the solidified melt and a suspension was formed for 4 hours. The strongly alkaline suspension thus obtained was adjusted to a pH of −0.5 with 1,400 L 10N hydrochloric acid in a vessel. The temperature increased to 70° C. in this context. The solution thus obtained was boiled for a period of 12 hours while releasing nitrous gases, whereby another 900 L 10N hydrochloric acid were added to maintain the pH of the solution at −0.5. Then the solution was filtered. The iridium recovery rate was 99% (calculated from the iridium content of the acidic solution determined by means of inductively coupled plasma emission (ICP) relative to the fine iridium used in the process, which had an iridium fraction of 53% by weight).

The invention claimed is:

1. A process for digestion of fine iridium, comprising the steps of:
   (a) forming a digestion material comprising 1 part by weight fine iridium and 3 to 20 parts by weight of a melt, the melt being a combination comprising 40 to 70 parts by weight sodium hydroxide, 15 to 30 parts by weight sodium nitrate, and 10 to 40 parts by weight sodium peroxide, whereby the sum of the weight fractions of the combination adds up to 100 parts by weight;
   (b) cooling the digestion material formed in step (a) to 20 to 70 ° C. to form a cooled digestion material;
   (c) dissolving the acid-soluble fractions of the cooled digestion material in water/halogen hydracid until an acidic aqueous solution with a pH value in the range of −1 to +1 is obtained; and
   (d) boiling the acidic aqueous solution obtained in step (c) until the formation of nitrous gases is completed.

2. The process according to claim 1, whereby the combination comprises 45 to 60 parts by weight sodium hydroxide, 15 to 25 parts by weight sodium nitrate, and 15 to 25 parts by weight sodium peroxide.

3. The process according to claim 1, whereby the combination comprises no further substances aside from sodium hydroxide, sodium nitrate, and sodium peroxide.

4. The process according to claim 1, whereby to form the digestion material in step (a), the fine iridium is added to the sodium hydroxide, followed by addition of the sodium nitrate and sodium peroxide.

5. The process according to claim 1, whereby, prior to step (b), the melt has a temperature in the range of 600 to 660° C. and is maintained at this level for 2 to 5 hours.

6. The process according to claim 1 whereby a weight ratio of digestion material : water : 8N to 12N halogen hydracid in the range of 1 : 2-5 : 3-10 is used in process step (c).

7. The process according to claim 1, whereby the fine iridium is a mixture of inorganic solid particles that contains metallic iridium and/or iridium oxide at a total iridium content of the mixture of 20 to 99% by weight.

8. The process according to claim 7, whereby the absolute grain sizes of the solid particles of the fine iridium is in the range of 50 to 200 µm.

9. The process according to claim 1, whereby the fine iridium is a mixture of solid particles that consists of one or more of metallic iridium and iridium oxide and one or more of:
   (A) up to 20% by weight of at least one elemental metal different from iridium, selected from the group of metals of atomic numbers 13, 21-30, 39-50, 72-76, and 78-82;
   (B) up to 70% by weight of at least one metal oxide different from iridium oxide;
   (C) up to 30% by weight of at least one inorganic substance different from metallic iridium, iridium oxide, (A) and (B); and
   (D) up to 1 % by weight organic substance, whereby the sum of the weight fractions in % by weight of metallic iridium, iridium oxide and the one or more of (A) to (D) adds up to 100% by weight and the total iridium content of the fine iridium is 20 to 99% by weight.

10. The process according to claim 9, whereby the at least one metal oxide of component (B) is selected from the group consisting of the oxides of the metals of component (A), alkali metal oxides and/or alkaline earth metal oxides.

11. The process according to claim 9, whereby at least one inorganic substance of component (C) comprises neither (i) an acidic substance, nor (ii) a substance that can be oxidised by sodium peroxide or sodium nitrate.

12. The process according to claim 9, whereby the at least one inorganic substance of component (C) is selected from the group consisting of (i) solid non-metal oxides, (ii) simple or complex salts, (iii) oxo, sulfur and/or phosphorus compounds of one or more metals of atomic numbers 13, 21-30, 39-50, or 72-82 different from oxides, simple salts, and complex salts of component (ii), and (iv) carbon.

13. The process according to claim 1, wherein step (c) further comprises separating insoluble ingredients from the acidic aqueous solution before step (d).

14. The process according to claim 1, further comprising step (e) separating insoluble ingredients from the acidic aqueous solution after step (d).

* * * * *